(12) United States Patent
Shirakura et al.

(10) Patent No.: US 12,063,944 B2
(45) Date of Patent: Aug. 20, 2024

(54) POWDERED GREEN TEA EXTRACT COMPOSITION

(71) Applicant: KAO CORPORATION, Tokyo (JP)

(72) Inventors: Iyori Shirakura, Kamisu (JP); Kenji Yamawaki, Narita (JP); Jun Saito, Kamisu (JP); Keita Kinoshita, Yachiyo (JP)

(73) Assignee: KAO CORPORATION, Tokyo (JP)

( * ) Notice: Subject to any disclaimer, the term of this patent is extended or adjusted under 35 U.S.C. 154(b) by 423 days.

(21) Appl. No.: 17/311,167

(22) PCT Filed: Dec. 6, 2019

(86) PCT No.: PCT/JP2019/047759
§ 371 (c)(1),
(2) Date: Jun. 4, 2021

(87) PCT Pub. No.: WO2020/116603
PCT Pub. Date: Jun. 11, 2020

(65) Prior Publication Data
US 2022/0022479 A1    Jan. 27, 2022

(30) Foreign Application Priority Data
Dec. 6, 2018 (JP) .................. 2018-229254

(51) Int. Cl.
A23F 3/22     (2006.01)
A23F 3/28     (2006.01)
A23L 29/212   (2016.01)
A23L 29/30    (2016.01)

(52) U.S. Cl.
CPC .............. *A23F 3/28* (2013.01); *A23L 29/212* (2016.08); *A23L 29/35* (2016.08); *A23V 2002/00* (2013.01)

(58) Field of Classification Search
CPC .......... A23V 2250/214; A23V 2200/15; A23V 2250/2132; A23V 2250/5114; A23V 2250/2116; A23V 2250/51; A23L 2/52; A23L 27/88; A23L 2/56; A23L 2/39; A23F 3/22; A23F 3/30; A23F 5/02
USPC ........................................ 426/597, 435, 590
See application file for complete search history.

(56) References Cited

U.S. PATENT DOCUMENTS

2003/0077374 A1   4/2003   Ohishi et al.
2006/0099318 A1   5/2006   Iwasaki et al.
2006/0141119 A1   6/2006   Yamamoto et al.
2007/0092624 A1*  4/2007   Iwasaki .................. A23F 3/163
                                                                426/597

FOREIGN PATENT DOCUMENTS

| CN | 105472990 A | 4/2016 |
|---|---|---|
| JP | 2003-145 A | 1/2003 |
| JP | 2003-169603 A | 6/2003 |
| JP | 2004-147508 A | 5/2004 |
| JP | 2004-222719 A | 8/2004 |
| JP | 3590050 B1 | 11/2004 |
| JP | 2005-270094 A | 10/2005 |
| JP | 2006-160656 A | 6/2006 |
| JP | 2006-174801 A | 7/2006 |
| JP | 2006-254819 A | 9/2006 |
| JP | 2008-301808 A | 12/2008 |
| JP | 2009-225728 A | 10/2009 |
| JP | 2010-68741 A | 4/2010 |
| JP | 2015-109829 | 6/2015 |
| JP | 2016-15923 A | 2/2016 |

(Continued)

OTHER PUBLICATIONS

Extended European Search Report issued Sep. 8, 2022 in European Patent Application No. 19892103.3, 5 pages.

(Continued)

*Primary Examiner* — Hong T Yoo

(74) *Attorney, Agent, or Firm* — Oblon, McClelland, Maier & Neustadt, L.L.P.

(57) ABSTRACT

Provided is a powdered green tea extract composition, including the following components (A) to (C): (A) non-polymer catechins; (B) quinic acid; and (C) a polysaccharide, wherein the powdered green tea extract composition has a volatile content of 5.6 mass % or less, wherein a mass ratio between the component (A) and the component (B), [(B)/(A)], is less than 0.2, wherein amass ratio between the component (A) and the component (C), [(C)/(A)], is 1.2 or more, wherein, when an absolute value ($\Delta a^*$) of a difference between an $a^*$ value in an $L^*a^*b^*$ color system of the powdered green tea extract composition after storage under an atmosphere of 37° C. and 50% RH for 6 weeks and an $a^*$ value in the $L^*a^*b^*$ color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and wherein a change rate calculated by the following expression (2) is 5% or more: $(\Delta a^* - \Delta a_1^*)/\Delta a^* \times 100$ (2) where $\Delta a_1^*$ and $\Delta a^*$ have the same meaning as $\Delta a_1^*$ and $\Delta a^*$ described in Description.

13 Claims, No Drawings

(56) References Cited

FOREIGN PATENT DOCUMENTS

JP          2017-63787 A    4/2017
JP     WO 2018012196 A1    1/2018

OTHER PUBLICATIONS

Zokti et al., "Green Tea Leaves Extract: Microencapsulation, Physicochemical and Storage Stability Study", Molecules, vol. 21, 2016, pp. 1-24.
International Search Report issued on Mar. 3, 2020 in PCT/JP2019/047759 filed on Dec. 6, 2019, 2 pages.
Nakabayashi. T et al., "Chemistry and functions of green tea, black tea and oolong tea," Kogaku Publishing Co., Ltd. Oct. 30, 1991. 6 pages (with unedited computer-generated English translation).
Japan Tea Central Public Interest Incorporated Association (Planning Cooperation), "New Edition: Functions of Tea—New Roles Revealed from Human Tests," Rural Culture Association, November 1. 2013. 13 pages, (with unedited computer-generated English translation).

\* cited by examiner

POWDERED GREEN TEA EXTRACT COMPOSITION

FIELD OF THE INVENTION

The present invention relates to a powdered green tea extract composition.

BACKGROUND OF THE INVENTION

In recent years, due to increasing health consciousness, attention has been attracted to the physiological effects of non-polymer catechins, and there is an increasing demand for a food and beverage such as a tea beverage. In order to allow the non-polymer catechins to sufficiently exhibit the physiological effects, it is advantageous to continuously take a food and beverage containing a high concentration of non-polymer catechins. In view of the foregoing, there have been investigated various technologies in which a green tea extract is purified to remove foreign substances, to obtain thereby highly purify non-polymer catechins. There have been proposed, for example, a method involving adding a solid catechin preparation containing a predetermined concentration of non-polymer catechins to a solvent in which the weight ratio between an organic solvent and water is controlled to a certain ratio, adding water to the resultant to adjust the weight ratio between the organic solvent and the water to a predetermined concentration, and then removing insoluble solids (Patent Document 1), a method involving dissolving a catechin composition in a mixed solvent in which the mass ratio between an organic solvent and water is controlled to a certain ratio and bringing the resultant into contact with activated carbon and acid clay or activated clay (Patent Document 2), and a method involving causing a green tea extract to pass through a column filled with a synthetic adsorbent to adsorb the green tea extract, causing water to pass through the column to wash the column, and then causing a predetermined concentration of an ethanol aqueous solution to pass through the column (Patent Document 3), and the like.

Meanwhile, a starch decomposition product, such as maltodextrin, is a kind of carbohydrate having a sugar bound thereto, and is known as water-soluble dietary fibers having moderate sweetness. The application of such starch decomposition product to a food and beverage has been investigated. For example, it has been reported that, when the starch decomposition product is added to a tea beverage, the cream-down during storage can be remedied while the original taste and flavor of tea is maintained (Patent Document 4). In addition, it has been known that instant green tea, which is obtained by mixing powdered tea leaves treated with an antioxidant such as ascorbic acid and an extract solution extracted with an aqueous solvent having an antioxidant such as ascorbic acid or dextrin added thereto, followed by drying, can suppress the color fading caused by light deterioration and the occurrence of an altered odor (Patent Document 5).

PRIOR ART DOCUMENT

Patent Document

[Patent Document 1] JP-A-2004-147508
[Patent Document 2] JP-A-2004-222719
[Patent Document 3] JP-A-2006-160656
[Patent Document 4] JP-A-2003-145
[Patent Document 5] JP-A-2006-254819

SUMMARY OF THE INVENTION

The present invention provides a powdered green tea extract composition, comprising the following components (A), (B), and (C):
  (A) non-polymer catechins;
  (B) quinic acid; and
  (C) a polysaccharide,
  wherein the powdered green tea extract composition has a volatile content of 5.6 mass % or less,
  wherein a mass ratio between the component (A) and the component (B), [(B)/(A)], is less than 0.2,
  wherein a mass ratio between the component (A) and the component (C), [(C)/(A)], is 1.2 or more,
  wherein, when an absolute value ($\Delta a^*$) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and
  wherein a change rate calculated by the following expression (2) is 5% or more:

$$(\Delta a^* - \Delta a_1^*)/\Delta a^* \times 100 \qquad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and $\Delta a^*$ represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

The present invention provides a method of producing a powdered green tea extract composition, comprising the step of mixing a green tea extract (a) having a content of non-polymer catechins (A) in solids of 40 mass % or more and a polysaccharide (C) in the presence of an aqueous solvent at such a ratio that a mass ratio between the component (A) and the component (C), [(C)/(A)], is 1.2 or more, followed by drying of a mixed solution.

DETAILED DESCRIPTION OF THE INVENTION

The technology described in Patent Document 5 involves suppressing color fading and a change in outer appearance when a coloring component derived from chlorophyll or the like derived from powdered tea leaves is exposed to light. In general, when a green tea extract composition is not purified, or when the purity of non-polymer catechins is relatively low, as long as the green tea extract composition is powdered and shielded from light, a significant change in outer appearance of the green tea extract composition is not found even after storage for a long period of time. However, the inventors of the present invention found the following problem. Along with an increase in degree of purification of the green tea extract composition and an increase in purity of the non-polymer catechins, even when the green tea extract composition is powdered and shielded from light, the green tea extract composition becomes liable to be reddish and the outer appearance thereof becomes liable to be significantly changed after storage for a long period of time.

The present invention relates to a powdered green tea extract composition which comprises high-purity non-polymer catechins and which is hardly changed in hue after storage for a long period of time, and a method of producing the powdered green tea extract composition.

The inventors of the present invention made investigations in view of the foregoing, and consequently found that, when a polysaccharide (C) is incorporated in a powdered green tea extract composition, which has a mass ratio between non-polymer catechins (A) and quinic acid (B), [(B)/(A)], of less than a specific value, at a specific mass ratio with respect to the non-polymer catechins (A), a powdered green tea extract composition in which a change in hue after storage for a long period of time is suppressed is obtained.

According to the present invention, a powdered green tea extract composition, which comprises high-purity non-polymer catechins and which is hardly changed in hue after storage for a long period of time, can be produced by a simple operation.

Powdered Green Tea Extract Composition

The powdered green tea extract composition of the present invention comprises non-polymer catechins as the component (A). As used herein, the term "non-polymer catechins" is a generic term for non-gallate forms, such as catechin, gallocatechin, epicatechin, and epigallocatechin, and gallate forms, such as catechin gallate, gallocatechin gallate, epicatechin gallate, and epigallocatechin gallate. In the present invention, at least one of the eight kinds of non-polymer catechins may be contained.

From the viewpoint of strengthening the non-polymer catechins, the powdered green tea extract composition of the present invention has a content of the component (A) of preferably 2 mass % or more, more preferably 3 mass % or more, even more preferably 4 mass % or more. In addition, from the viewpoint of suppressing a change in hue after storage for a long period of time, the content of the component (A) is preferably 45 mass % or less, more preferably 42 mass % or less, even more preferably 38 mass % or less. The range of the content of the component (A) is preferably from 2 mass % to 45 mass %, more preferably from 3 mass % to 42 mass %, even more preferably from 4 mass % to 38 mass %. The content of the component (A) is defined on the basis of the total amount of the eight kinds of compounds, and may be measured by an analysis method suitable for the state of a measurement sample among generally known measurement methods. The content may be analyzed by, for example, liquid chromatography. A specific example thereof is a method described in Examples to be described later. In addition, at the time of the measurement of the content, the necessary treatment as described below may be appropriately performed: the sample is freeze-dried for adapting it to the detection range of an apparatus; or contaminants in the sample are removed for adapting it to the resolution of the apparatus.

The powdered green tea extract composition of the present invention comprises quinic acid as the component (B). It is preferred that the component (B) be derived from a raw material and be not newly added.

From the viewpoint of taste and flavor, the powdered green tea extract composition of the present invention has a content of the component (B) of preferably 3 mass % or less, more preferably 2 mass % or less, more preferably 1.0 mass %, or less, more preferably 0.8 mass % or less, even more preferably 0.6 mass % or less. The lower limit value of the content of the component (B) may be 0 mass %, However, from the viewpoint of production efficiency, the content of the component (B) is preferably 0.00001 mass % or more, more preferably 0.0001 mass % or more, even more preferably 0.001 mass % or more. The range of the content of the component (B) is preferably from 0.00001 mass % to 3 mass %, more preferably from 0.00001 mass % to 2 mass %, more preferably from 0.00001 mass % to 1 mass %, more preferably from 0.0001 mass % to 0.8 mass %, even more preferably from 0.001 mass % to 0.6% mass %. The content of the component (B) may be measured by an analysis method suitable for the state of a measurement sample among generally known measurement methods, and for example, may be analyzed by liquid chromatography. A specific example thereof is a method described in Examples to be described later. In addition, at the time of the measurement of the content, the necessary treatment as described below may be appropriately performed: the sample is freeze-dried for adapting it to the detection range of an apparatus; or contaminants in the sample are removed for adapting it to the resolution of the apparatus.

The powdered green tea extract composition of the present invention comprises a polysaccharide as the component (C). As used herein, the term "polysaccharide" refers to a high-molecular compound in which various sugars are polymerized by glycoside bonds.

As the component (C), from the viewpoint of suppressing a change in hue after storage for a long period of time, a polysaccharide derived from starch is preferred, and there is given, for example, a starch decomposition product. As used herein, the term "starch decomposition product" refers to starch decomposed through use of an enzyme and/or an acid. There is given, for example, dextrin or the like obtained by dispersing starch in water, adding an enzyme (for example, α-amylase) and/or an acid (for example, hydrochloric acid or oxalic acid) to the mixture, and gelatinizing and hydrolyzing the resultant by heating. In addition, as required, the resultant may be purified by decolorization, deionization, or the like, and may also be used in a liquid form or in a powdery form through spray drying, drum drying, or the like. Examples of the starch decomposition product include a corn starch decomposition product, a waxy corn starch decomposition product, a tapioca decomposition product, a potato decomposition product, a glutinous rice decomposition product, a sweet potato decomposition product, a wheat decomposed product, and the like. Of those, from the viewpoint of suppressing a change in hue after storage for a long period of time, the waxy corn starch decomposition product and the sweet potato decomposition product are preferred, and the waxy corn starch decomposition product is more preferred.

In addition, from the viewpoint of suppressing a change in hue after storage for a long period of time, the component (C) has a dextrose equivalent (DE) of preferably 1 or more, more preferably 2 or more, more preferably 3 or more, even more preferably 5 or more, and preferably 25 or less, more preferably 20 or less, even more preferably 15 or less. The range of the DE is preferably from 1 to 25, more preferably from 2 to 20, more preferably from 3 to 20, more preferably from 3 to 15, even more preferably from 5 to 15. As used herein, the term "dextrose equivalent (DE)" refers to a value measured by a SOMOGYI method, and may be measured by a method described in Examples described later.

Of those, maltodextrin is preferred as the polysaccharide serving as the component (C). As used herein, the term "maltodextrin" refers to a component in which glucose is connected mainly by α-1,4 bonds (partially including α-1,6 bonds in the case of a glutinous rice starch decomposition product) and the DE is generally from 3 to 20, preferably from 5 to 15.

From the viewpoint of suppressing a change in hue after storage for a long period of time, the powdered green tea extract composition of the present invention has a content of the component (C) of preferably 41 mass % or more, more preferably 44 mass % or more, more preferably 47 mass % or more, even more preferably 50 mass % or more. In addition, from the viewpoint of taste and flavor, the content of the component (C) is preferably 95 mass % or less, more preferably 85 mass % or less, more preferably 75 mass % or less, even more preferably 65 mass % or less. The range of the content of the component (C) is preferably from 41 mass % to 95 mass %, more preferably from 44 mass % to 85 mass %, more preferably from 47 mass % to 75 mass %, even more preferably from 50 mass % to 65 mass %. The content of the component (C) may be measured by an analysis method suitable for the state of a measurement sample among generally known measurement methods, and for example, may be analyzed by liquid chromatography. A specific example thereof is a method described in Examples to be described later. In addition, at the time of the measurement of the content, the necessary treatment as described below may be appropriately performed: the sample is freeze-dried for adapting it to the detection range of an apparatus; or contaminants in the sample are removed for adapting it to the resolution of the apparatus.

The powdered green tea extract composition of the present invention comprises the high-purity component (A), and has a mass ratio between the component (A) and the component (B), [(B)/(A)], of less than 0.2. However, from the viewpoint of taste and flavor and the viewpoint of ease of receiving the effects of the present invention, the mass ratio [(B)/(A)] is preferably 0.15 or less, more preferably 0.1 or less, even more preferably 0.05 or less. The lower limit value of the mass ratio [(B)/(A)] may be 0. However, from the viewpoint of production efficiency, the mass ratio [(B)/(A)] is preferably $0.1 \times 10^{-6}$ or more, more preferably $1 \times 10^{-6}$ or more, even more preferably $10 \times 10^{-6}$ or more. The range of the mass ratio [(B)/(A)] is preferably $0.1 \times 10^{-6}$ or more and less than 0.2, more preferably $0.1 \times 10^{-6}$ or more and 0.15 or less, more preferably $1 \times 10^{6}$ or more and 0.1 or less, even more preferably $10 \times 10^{-6}$ or more and 0.05 or less.

The powdered green tea extract composition of the present invention has a mass ratio between the component (A) and the component (C), [(C)/(A)], of 1.2 or more. However, from the viewpoint of suppressing a change in hue after storage for a long period of time, the mass ratio [(C)/(A)] is preferably 1.3 or more, more preferably 1.4 or more, more preferably 1.5 or more, more preferably 1.7 or more, more preferably 2.0 or more, more preferably 2.5 or more, more preferably 3.0 or more, even more preferably 5 or more. In addition, from the viewpoint of the degree of freedom of formulation when a predetermined amount of non-polymer catechins is blended, the mass ratio [(C)/(A)] is preferably 25 or less, more preferably 20 or less, more preferably 15 or less, even more preferably 10 or less. The range of the mass ratio [(C)/(A)] is preferably from 1.2 to 25, more preferably from 1.3 to 20, more preferably from 1.4 to 15, more preferably from 1.5 to 15, more preferably from 1.7 to 15, more preferably from 2.0 to 15, more preferably from 2.5 to 15, more preferably from 3.0 to 10, even more preferably from 5 to 10.

As used herein, the term "powder" means a particulate form, and is a concept that encompasses a granular form as well as a powdery form. As a form of the powdered green tea extract composition of the present invention, the powdery form is preferred from the viewpoints of ease of handling and solubility.

From the viewpoint of suppressing aggregation (undissolved lumps) at the time of dissolution, the powdered green tea extract composition of the present invention has an average particle size of preferably 1 μm or more, more preferably 10 μm or more, even more preferably 20 μm or more. In addition, from the viewpoint of solubility, the average particle size is preferably 1,000 μm or less, more preferably 800 μm or less, even more preferably 500 μm or less. The range of the average particle size is preferably from 1 μm to 1,000 μm, more preferably from 10 μm to 800 μm, even more preferably from 20 μm to 500 μm. As used herein, the term "average particle size" refers to an average particle size measured by a laser diffraction and scattering method, and a median diameter ($d_{50}$) obtained by creating a particle size distribution of the powdered green tea extract composition based on the number is defined as the average particle size.

In addition, the powdered green tea extract composition of the present invention has a volatile content of 5.6 mass % or less. However, from the viewpoint of suppressing a change in hue after storage for a long period of time, the volatile content is preferably 5.0 mass % or less, more preferably 4.5 mass % or less, even more preferably 4.0 mass % or less. In addition, from the viewpoints of production cost and suppression of thermal deterioration at the time of production, the volatile content is preferably 1.8 mass % or more, more preferably 1.9 mass % or more, even more preferably 2.0 mass % or more. The range of the volatile content is preferably from 1.8 mass % to 5.6 mass %, more preferably from 1.9 mass % to 5.0 mass %, more preferably from 1.9 mass % to 4.5 mass %, even more preferably from 2.0 mass % to 4.0 mass %. As used herein, the term "volatile content" refers to a content ratio of volatile components when a sample is heated in an electric thermostat dryer at 105° C. for 15 minutes, and refers to a value calculated from the mass of the sample before and after heating by the following expression (1). The volatile content is a concept that encompasses, for example, water and volatile substances other than water.

$$\text{Volatile content (mass \%)} = (P-Q)/P \times 100 \qquad (1)$$

In the expression, P represents the mass of the sample before heating, and Q represents the mass of the sample after heating.

In the powdered green tea extract composition of the present invention, a change in hue after storage for a long period of time is suppressed. Specifically, when an absolute value (Δa*) of a difference between an a* value of the powdered green tea extract composition after storage under an atmosphere of 37° C. and 50% RH for 6 weeks and an a* value of the powdered green tea extract composition before the start of storage (for example, immediately after production) is obtained, the Δa* of the powdered green tea extract composition of the present invention indicates a value less than Δa* of a powdered green tea extract composition which has the same mass ratio [(B)/(A)] as that of the powdered green tea extract composition of the present invention, and which is free of the component (C) (hereinafter referred to as "powdered green tea extract composition α"). A change rate thereof, that is, a change rate calculated by the following expression (2) (hereinafter sometimes referred to as "suppression rate") is generally 5% or more. However, from the viewpoint of suppressing a change in hue after storage for a long period of time, the change rate is preferably 10° or more, more preferably 20° or more, more preferably 30° or more, more preferably 40° or more, more preferably 50° or more, even more preferably 60° or more. In addition, the suppression rate maybe 100%. However, from the viewpoint of taste and flavor, cost, and production efficiency, the suppression rate is preferably less than 100%, more preferably 99% or less.

$$\text{Change rate (\%)} = (\Delta a^* - \Delta a_1^*)/\Delta a^* \times 100 \quad (2)$$

In the expression, $\Delta a_1^*$ represents the absolute value of the difference between the a* value in the L*a*b* color system of the powdered green tea extract composition of the present invention after storage under the atmosphere of 37° C. and 50% RH for 6 weeks and the a* value in the L*a*b* color system of the powdered green tea extract composition of the present invention immediately after production, and $\Delta a$ represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition a immediately after production.

The condition of storage under an atmosphere of 37° C. and 50% RH for 6 weeks generally corresponds to storage at 25° C.±2° C. and 60% RH±5% for 8 months. As used herein, the term "value" refers to a coordinate value representing hue and chroma in the expression of a color in the L*a*b* color system, and refers to a coordinate value representing chroma in a red direction. The L*a*b* color system also uses b*, which is a coordinate value representing chroma in a yellow direction, but in the present invention, a*, which is most likely to manifest when the powdered green tea extract composition undergoes a change in hue, is specified. The change in hue ($\Delta a^*$) is measured in accordance with the description of "Measurement of Change in Hue" in Examples to be described later.

From the viewpoints of taste and flavor, cost, and production efficiency, the value of the $\Delta a^*$ of the powdered green tea extract composition of the present invention is preferably 0.1 or more, more preferably 0.11 or more, even more preferably 0.13 or more.

From the viewpoint of suppressing a change in hue after storage for a long period of time, it is preferred that the upper limit value of the $\Delta a^*$ of the powdered green tea extract composition of the present invention be set as described below depending on the value of the mass ratio [(B)/(A)].

From the viewpoint of suppressing a change in hue after storage for a long period of time, when the mass ratio [(B)/(A)] is 0.05 or less, the value of the $\Delta a^*$ is preferably less than 4.0, more preferably 3.5 or less, more preferably 3.0 or less, even more preferably 2.5 or less.

In addition, from the viewpoint of suppressing a change in hue after storage for a long period of time, when the mass ratio [(B)/(A)] is more than 0.05 and 0.15 or less, the value of the $\Delta a^*$ is preferably 3.5 or less, more preferably 3.0 or less, more preferably 2.5 or less, even more preferably 2.0 or less.

Further, from the viewpoint of suppressing a change in hue after storage for a long period of time, when the mass ratio [(B)/(A)] is more than 0.15, the value of the $\Delta a^*$ is preferably 2.5 or less, more preferably 1.5 or less, even more preferably 1.0 or less.

Method of producing Powdered Green Tea Extract Composition

The powdered green tea extract composition of the present invention may be produced by an appropriate method as long as the powdered green tea extract composition has the above-mentioned characteristics, and is not particularly limited. The powdered green tea extract composition of the present invention may be produced, for example, by mixing a green tea extract (a) having a content of non-polymer catechins (A) in solids of 40 mass % or more and a polysaccharide (C) in the presence of an aqueous solvent at such a ratio that a mass ratio [(C)/(A)] between the component (A) and the component (C), [(C)/(A)], is 1.2 or more, followed by drying of a mixed solution.

The green tea extract (a) is obtained by purifying a raw material green tea extract to remove foreign substances, to thereby adjust the content of the non-polymer catechins (A) in the solids to 40 mass % or more.

The raw material green tea extract may be generally obtained by extraction from green tea leaves. As the green tea leaves, there may be given, for example, tea leaves of the genus *Camellia*, such as tea leaves (*Camellia sinensis*) selected from *C. sinensis*. var. *sinensis* (including the Yabukita variety), *C. sinensis*. var. *assamica*, and hybrids thereof. Specific examples thereof include ordinary green tea, deep-steamed ordinary green tea, roasted tea, coarse tea, refined green tea, covered tea, steamed green tea, pan-roasted tea, stem tea, twig tea, bud tea, and the like. The tea variety of tea leaves and the sampling period are not particularly limited, and may be appropriately selected.

As an extraction method, known methods, such as kneader extraction, stirring extraction (batch extraction), countercurrent extraction (drip extraction), and column extraction, may be adopted.

The extraction conditions may be appropriately selected depending on the extraction method, and for example, an aqueous solvent may be used as an extraction solvent. As used herein, the term "aqueous solvent" refers to a solvent containing water, and the content of water in the aqueous solvent is generally from 1 mass % to 100 mass %, preferably from 30 mass % to 100 mass %. Examples of the aqueous solvent include water, an organic solvent aqueous solution, carbonated water, and the like. Examples of the organic solvent include an alcohol, a ketone, an ester, and the like. In consideration of the use in food, the alcohol is preferred, and ethanol is more preferred. Of those, water is preferred as the aqueous solvent. Examples of the water include tap water, natural water, distilled water, ion-exchanged water, and the like. Of these, the ion-exchanged water is preferred from the viewpoint of taste.

The pH (20° C.) of the aqueous solvent is generally from 4 to 10, preferably from 5 to 7. A pH adjuster may be added to the aqueous solvent in order to obtain a desired pH.

The temperature of the aqueous solvent is generally from 25° C. to 100° C., preferably from 50° C. to 100° C., more preferably from 80° C. to 99° C.

The extraction ratio and the extraction time vary depending on the extraction method and scale. For example, the extraction ratio is generally from 1 time to 50 times, and the extraction time is generally from 5 minutes to 60 minutes.

After the extraction, the green tea leaves and the green tea extract may be separated from each other by known solid-liquid separation means, such as filtration, centrifugation, or membrane treatment.

In addition, a commercially available product may be used as the raw material green tea extract. There are given, for example, "Polyphenon" manufactured by Mitsui Norin Co., Ltd., "THEA-FLAN" manufactured by Ito En, Ltd., "Sunphenon" manufactured by Taiyo Kagaku Co., Ltd., and the like.

There is no particular limitation on a purification method as long as the content of the non-polymer catechins (A) in the solids is 40 mass % or more. However, from the viewpoint of taste and flavor and the viewpoint of ease of receiving the effects of the present invention, there may be given any one of the following methods (i) to (iii) or a combination of two or more of the methods.

(i) A method involving suspending a raw material green tea extract in water or an organic solvent aqueous solution (for example, an ethanol aqueous solution) and removing a generated precipitate.

(ii) A method involving bringing a raw material green tea extract into contact with at least one kind of adsorbent selected from activated carbon, acid clay, and activated clay.

(iii) A method involving bringing a raw material green tea extract into contact with a synthetic adsorbent or an ion exchange resin.

Regarding the above-mentioned method (i), reference may be made to, for example, JP-A-2004-147508 and JP-A-2004-149416. In addition, regarding the above-mentioned method (ii), reference may be made to, for example, JP-A-2004-222719 and JP-A-2005-270094. Further, regarding the above-mentioned method (iii), reference may be made to, for example, JP-A-2004-222592, JP-A-2006-8580, and JP-A-2006-160656.

In addition, in the above-mentioned methods (i) to (iii), a raw material green tea extract subjected to tannase treatment may be used as the raw material green tea extract. Alternatively, after treatment by any one or more of the methods (i) to (iii), the raw material green tea extract may be subjected to tannase treatment. As used herein, the term "tannase treatment" refers to bringing a green tea extract into contact with an enzyme having tannase activity. As a specific operation method in the tannase treatment, a known method may be adopted, and there may be given, for example, a method described in JP-A-2004-321105.

From the viewpoint of taste and flavor and the viewpoint of ease of receiving the effects of the present invention, the green tea extract (a) thus obtained has a content of the non-polymer catechins (A) in the solids of preferably 45 mass % or more, more preferably 50 mass % or more, more preferably 55 mass % or more, even more preferably 60 mass % or more. The upper limit value of the content of the non-polymer catechins (A) in the solids may be 100 mass %. However, from the viewpoint of production efficiency, the content is preferably 95 mass % or less, more preferably 90 mass % or less, even more preferably 85 mass % or less. As used herein, the term "solids" refers to a residue obtained by drying a sample in an electric thermostat dryer at 105° C. for 3 hours to remove volatile components.

The green tea extract (a) may be used as it is, or may be concentrated or dried before use. As a concentration method, there are given, for example, a normal-pressure concentration method involving evaporating a solvent under normal pressure, a reduced-pressure concentration method involving evaporating a solvent under reduced pressure, a membrane concentration method involving removing a solvent by membrane separation, and the like. In addition, as a drying method, for example, a known method, such as spray drying, drum drying, or freeze drying, may be adopted.

In addition, the green tea extract (a) has a mass ratio between the non-polymer catechins (A) and the quinic acid (B), [(B)/(A)], of generally less than 0.2. However, from the viewpoint of taste and flavor and the viewpoint of ease of receiving the effects of the present invention, the mass ratio [(B)/(A)] is preferably 0.15 or less, more preferably 0.1 or less, even more preferably 0.05 or less. The lower limit value of the mass ratio [(B)/(A)] may be 0. However, from the viewpoint of production efficiency, the mass ratio [(B)/(A)] is preferably $0.1 \times 10^{-6}$ or more, more preferably $1 \times 10^{-6}$ or more, even more preferably $10 \times 10^{-6}$ or more. The range of the mass ratio [(B)/(A)] is preferably $0.1 \times 10^{-6}$ or more and less than 0.2, more preferably $1 \times 10^{-6}$ or more and 0.15 or less, more preferably $10 \times 10^{-6}$ or more and 0.1 or less, even more preferably 0.001 or more and 0.05 or less. In the present invention, in order to set the mass ratio [(B)/(A)] of the powdered green tea extract composition within the above-mentioned ranges, a plant extract other than the green tea extract (a) may be blended in addition to the green tea extract (a).

Next, the green tea extract (a) and the polysaccharide (C) are mixed at a predetermined ratio in the presence of an aqueous solvent to prepare a mixed solution. The specific state of the polysaccharide (C) is as described above.

The mixing order of the green tea extract (a), the polysaccharide (C), and the aqueous solvent is not particularly limited, and the three may be added in any order, or the three may be added at the same time. It is only required that the aqueous solvent, the green tea extract (a), and the polysaccharide (C) coexist in the mixed solution before drying.

The green tea extract (a) and the polysaccharide (C) are mixed at such a ratio that the mass ratio between the non-polymer catechins (A) and the polysaccharide (C), [(C)/(A)], is 1.2 or more. However, from the viewpoint of suppressing a change in hue after storage for a long period of time, the mass ratio [(C)/(A)] is preferably 1.3 or more, more preferably 1.4 or more, more preferably 1.5 or more, more preferably 1.7 or more, more preferably 2.0 or more, more preferably 2.5 or more, more preferably 3.0 or more, even more preferably 5 or more. In addition, from the viewpoint of the degree of freedom of formulation when a predetermined amount of non-polymer catechins is blended, the mass ratio [(C)/(A)] is preferably 25 or less, more preferably 20 or less, more preferably 15 or less, even more preferably 10 or less. The range of the mass ratio [(C)/(A)] is preferably from 1.2 to 25, more preferably from 1.3 to 20, more preferably from 1.4 to 15, more preferably from 1.7 to 15, even more preferably from 2.0 to 15, more preferably from 2.5 to 15, more preferably from 3.0 to 10, even more preferably from 5 to 10.

Examples of the aqueous solvent may include water, an organic solvent aqueous solution, and the like. Specific examples of the water and the organic solvent include the same solvents as those described above. It is only required that the organic solvent aqueous solution contain water in an amount of 1 mass % or more, preferably 30 mass % or more. Of those, as the aqueous solvent, from the viewpoint of suppressing a change in hue after storage for a long period of time, water is preferred, and ion-exchanged water is more preferred.

From the viewpoint of suppressing a change in hue after storage for a long period of time, the usage amount of the aqueous solvent is adjusted so that the content of the non-polymer catechins (A) in the mixed solution is preferably 1 mass % or more, more preferably 2.5 mass % or more, more preferably 5 mass % or more, more preferably 7 mass % or more, even more preferably 10 mass % or more. From the same viewpoint, the usage amount of the aqueous solvent is adjusted so that the content of the non-polymer catechins (A) in the mixed solution is preferably 30 mass % or less, more preferably 25 mass % or less, more preferably 20 mass % or less, even more preferably 15 mass % or less. The range of the content of the non-polymer catechins (A) in the mixed solution is preferably from 1 mass % to 30 mass %, more preferably from 2.5 mass % to 25 mass %, more preferably from 5 mass % to 20 mass %, more preferably from 7 mass % to 20 mass %, even more preferably from 10 mass % to 15 mass %.

In the case where a solvent is not contained in the green tea extract (a) or the polysaccharide (C), it is only required that the usage amount of the aqueous solvent be adjusted so that the content of the non-polymer catechins (A) in the mixed solution falls within the above-mentioned ranges when the aqueous solvent, the green tea extract (a), and the polysaccharide (C) are mixed. In addition, the usage amount of the aqueous solvent may also be adjusted so that the content of the non-polymer catechins (A) in the mixed solution falls within the above-mentioned ranges by mixing a predetermined amount of the aqueous solvent, the green tea extract (a), and the polysaccharide (C) and adding an additional aqueous solvent to the mixture. Meanwhile, when a solvent is contained in any one of the green tea extract (a) and the polysaccharide (C), the usage amount of the aqueous solvent may be adjusted so that the content of the non-polymer catechins (A) in the mixed solution falls within the above-mentioned ranges in consideration of the amount of the solvent. In the case where the content of the non-polymer catechins (A) in the mixed solution satisfies the above-mentioned requirement depending on the amount of the solvent contained in any one of the green tea extract (a) and the polysaccharide (C), when water is contained in the solvent, it is only required that the green tea extract (a) and the polysaccharide (C) be mixed as they are. In addition, in the case where the content of the non-polymer catechins (A) in the mixed solution satisfies the above-mentioned requirement depending on the amount of the solvent contained in any one of the green tea extract (a) and the polysaccharide (C), when water is not contained in the solvent, the usage amount of the aqueous solvent may be adjusted so that the content of the non-polymer catechins (A) in the mixed solution falls within the above-mentioned ranges by concentrating or removing the solvent, and then adding an aqueous solvent.

An appropriate method, such as stirring or shaking, may be adopted as a mixing method, and, for example, a mixing apparatus may be used. The mixing system of the mixing apparatus may be of a rotating vessel type or a fixed vessel type. As the rotating vessel type, for example, a horizontal cylinder type, a V-type, a double-cone type, or a cubic type may be adopted. In addition, as the fixed vessel type, for example, a ribbon type, a screw type, a conical screw type, a paddle type, a fluidized bed type, or a Phillips blender may be adopted.

From the viewpoint of suppressing a change in hue after storage for a long period of time, a mixing temperature is preferably 15° C. or more, more preferably 18° C. or more, even more preferably 20° C. or more. In addition, from the viewpoint of taste and flavor, the mixing temperature is preferably 40° C. or less, more preferably 35° C. or less, even more preferably 30° C. or less. The range of the mixing temperature is preferably from 15° C. to 40° C., more preferably from 18° C. to 35° C., even more preferably from 20° C. to 30° C.

From the viewpoint of suppressing a change in hue after storage for a long period of time, a mixing time is preferably 3 minutes or more, more preferably 5 minutes or more, even more preferably 6 minutes or more. In addition, from the viewpoint of production efficiency, the mixing time is preferably 90 minutes or less, more preferably 60 minutes or less, even more preferably 30 minutes or less. The range of the mixing time is preferably from 3 minutes to 90 minutes, more preferably from 5 minutes to 60 minutes, even more preferably from 6 minutes to 30 minutes.

Next, the mixed solution is dried.

As a drying method, a known method may be adopted. There are given, for example, spray drying, drum drying, freeze drying, and the like. Drying may be performed so that the volatile content of the powdered green tea extract composition falls within the above-mentioned ranges.

In addition, the powdered green tea extract composition may be produced as a granulated product by a known granulation method. Examples of the granulation method include spray granulation, fluidized bed granulation, compression granulation, tumbling granulation, stirring granulation, extrusion granulation, and powder coating granulation. Granulation conditions may be appropriately selected depending on the granulation method.

Now, regarding the above-mentioned embodiment, preferred modes of the present invention are further disclosed.

<1> A powdered green tea extract composition, comprising the following components (A), (B), and (C):
  (A) non-polymer catechins;
  (B) quinic acid; and
  (C) a polysaccharide,
  wherein the powdered green tea extract composition has a volatile content of from 0.9 mass % to 5.0 mass %,
  wherein a mass ratio between the component (A) and the component (B), [(B)/(A)], is less than 0.2,
  wherein a mass ratio between the component (A) and the component (C), [(C)/(A)], is 1.2 or more,
  wherein, when an absolute value (Δa*) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the Δa* of the powdered green tea extract composition is a value less than Δa* of a powdered green tea extract composition α which has the same mass ratio [(B)/(A)] as the mass ratio [(B)/(A)] of the powdered green tea extract composition, and which is free of the component (C), and
  wherein a change rate calculated by the following expression (2) is 5% or more:

$$(\Delta a^* - \Delta a_1^*)/\Delta a^* \times 100 \qquad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and Δa* represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<2> A powdered green tea extract composition, comprising the following components (A), (B), and (C):
(A) non-polymer catechins;
(B) quinic acid; and
(C) a polysaccharide,
wherein the powdered green tea extract composition has a volatile content of 5.6 mass % or less,
wherein a mass ratio between the component (A) and the component (B), [(B)/(A)], is from $1\times10^{-6}$ to 0.1,
wherein a mass ratio between the component (A) and the component (C), [(C)/(A)], is 1.2 or more,
wherein, when an absolute value ($\Delta a^*$) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and
wherein a change rate calculated by the following expression (2) is 5% or more:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and $\Delta a^*$ represents an absolute value of a difference between an a* value in the L*a*b* color system of the powdered green tea extract composition u after storage under the atmosphere of 37° C. and 50% RH for 6 weeks and an a* value in the L*a*b* color system of the powdered green tea extract composition α immediately after production.

<3> A powdered green tea extract composition, comprising the α following components (A), (B), and (C):
(A) non-polymer catechins;
(B) quinic acid; and
(C) a polysaccharide,
wherein the powdered green tea extract composition has a volatile content of 5.6 mass % or less,
wherein a mass ratio between the component (A) and the component (B), [(B)/(A)], is less than 0.2,
wherein a mass ratio between the component (A) and the component (C), [(C)/(A)], is from 1.7 to 15,
wherein, when an absolute value ($\Delta a^*$) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and
wherein a change rate calculated by the following expression (2) is 5% or more:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and $\Delta a^*$ represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<4> A powdered green tea extract composition, comprising the following components (A), (B), and (C):
(A) non-polymer catechins;
(B) quinic acid; and
(C) a polysaccharide,
wherein the powdered green tea extract composition has a volatile content of 5.6 mass % or less,
wherein a mass ratio between the component (A) and the component (B), [(B)/(A)], is less than 0.2,
wherein a mass ratio between the component (A) and the component (C), [(C)/(A)], is 1.2 or more,
wherein, when an absolute value ($\Delta a^*$) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and
wherein a change rate calculated by the following expression (2) is from 40% to 99%:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and $\Delta a^*$ represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<5> A powdered green tea extract composition, comprising the following components (A), (B), and (C):
(A) non-polymer catechins;
(B) quinic acid; and
(C) a polysaccharide,
wherein the powdered green tea extract composition has a volatile content of from 1.9 mass % to 5.0 mass %,
wherein a mass ratio between the component (A) and the component (B), [(B)/(A)], is from $1\times10^{-6}$ to 0.1,
wherein a mass ratio between the component (A) and the component (C), [(C)/(A)], is 1.2 or more,
wherein, when an absolute value ($\Delta a^*$) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the Δa* of the powdered green tea extract composition is a value less than Δa* of a powdered green tea extract composition α which has the same mass ratio [(B)/(A)] as the mass ratio [(B)/(A)] of the powdered green tea extract composition, and which is free of the component (C), and wherein a change rate calculated by the following expression (2) is 5% or more:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and Δa* represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<6> A powdered green tea extract composition, comprising the following components (A), (B), and (C):
(A) non-polymer catechins;
(B) quinic acid; and
(C) a polysaccharide,
wherein the powdered green tea extract composition has a volatile content of 5.6 mass % or less,
wherein a mass ratio between the component (A) and the component (B), [(B)/(A)], is less than 0.2,
wherein a mass ratio between the component (A) and the component (C), [(C)/(A)], is from 1.7 to 15,
wherein, when an absolute value (Δa*) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the Δa* of the powdered green tea extract composition is a value less than Δa* of a powdered green tea extract composition α which has the same mass ratio [(B)/(A)] as the mass ratio [(B)/(A)] of the powdered green tea extract composition and which is free of the component (C), and
wherein a change rate calculated by the following expression (2) is from 40% to 99%:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and Δa* represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<7> A powdered green tea extract composition, comprising the following components (A), (B), and (C):
(A) non-polymer catechins;
(B) quinic acid; and
(C) a polysaccharide,
wherein the powdered green tea extract composition has a volatile content of from 1.9 mass % to 5.0 mass %,
wherein a mass ratio between the component (A) and the component (B), [(B)/(A)], is from $1 \times 10^{-6}$ to 0.1,
wherein a mass ratio between the component (A) and the component (C), [(C)/(A)], is from 1.7 to 15,
wherein, when an absolute value (Δa*) of a difference between an a* value in an L*a*b* color system of the powdered green tea extract composition after storage under an atmosphere of 37° C. and 50% RH for 6 weeks and an a* value in the L*a*b* color system of the powdered green tea extract composition immediately after production is obtained, the Δa* of the powdered green tea extract composition is a value less than Δa* of a powdered green tea extract composition α which has the same mass ratio [(B)/(A)] as the mass ratio [(B)/(A)] of the powdered green tea extract composition and which is free of the component (C), and
wherein a change rate calculated by the following expression (2) is from 40% to 99%:

$$(\Delta a^* - \Delta a_1^*)/\Delta a^* \times 100 \quad (2)$$

where $\Delta a_1^*$ represents the absolute value of the difference between the a* value in the L*a*b* color system of the powdered green tea extract composition after storage under the atmosphere of 37° C. and 50% RH for 6 weeks and the a* value in the L*a*b* color system of the powdered green tea extract composition immediately after production, and Δa* represents an absolute value of a difference between an a* value in the L*a*b* color system of the powdered green tea extract composition α after storage under the atmosphere of 37° C. and 50% RH for 6 weeks and an a* value in the L*a*b* color system of the powdered green tea extract composition α immediately after production.

<8> The powdered green tea extract composition according to anyone of the above-mentioned items <1> to <7>, wherein a content of the component (A) is from 2 mass % to 45 mass %, a content of the component (B) is from 0.00001 mass % to 3 mass %, and a content of the component (C) is from 41 mass % to 95 mass %.

<9> The powdered green tea extract composition according to anyone of the above-mentioned items <1> to <7>, wherein a content of the component (A) is from 3 mass % to 42 mass %, a content of the component (B) is from 0.00001 mass % to 2 mass %, and a content of the component (C) is from 44 mass % to 85 mass %.

<10> The powdered green tea extract composition according to anyone of the above-mentioned items <1> to <7>, wherein a content of the component (A) is from 4 mass % to 38 mass %, a content of the component (B) is from 0.00001 mass % to 1 mass %, and a content of the component (C) is from 47 mass % to 75 mass %.

<11> A method of producing a powdered green tea extract composition, comprising the step of mixing a green tea extract (a) having a content of non-polymer catechins (A) in solids of from 40 mass % to 99 mass % and a polysaccharide (C) in the presence of an aqueous solvent at such a ratio that a mass ratio between the component (A) and the component (C), [(C)/(A)], is from 1.7 to 15, followed by drying of a mixed solution.

<12> A method of producing a powdered green tea extract composition, comprising the step of mixing a green tea extract (a) having a content of non-polymer catechins (A) in solids of from 40 mass % to 95 mass % and a polysaccharide (C) in the presence of an aqueous solvent at such a ratio that a mass ratio between the component (A) and the component (C), [(C)/(A)], is from 1.7 to 15, followed by drying of a mixed solution.

<13> The method of producing a powdered green tea extract composition according to the above-mentioned item <11> or <12>, wherein the aqueous solvent is water or an organic solvent aqueous solution.

<14> The method of producing a powdered green tea extract composition according to the above-mentioned item <11> or <12>, wherein the aqueous solvent is used in such an amount that a content of the component (A) in the mixed solution is from 1 mass % to 30 mass %.

<15> The method of producing a powdered green tea extract composition according to the above-mentioned item <11> or <12>, wherein the mixing is performed for a time of from 3 minutes to 90 minutes.

Examples

1. Analysis of Non-Polymer Catechins

A sample dissolved and diluted with pure water was measured by a gradient method using a high-performance liquid chromatograph (model SCL-10AVP) manufactured by Shimadzu Corporation having mounted thereon an octadecyl group-introduced packed column for liquid chromatography (L-Column™ ODS, 4.6 mmφ×250 mm: manufactured by Chemicals Evaluation and Research Institute, Japan) at a column temperature of 35° C. The measurement was carried out using a distilled water solution containing 0.1 mol/L acetic acid as a mobile phase solution A and an acetonitrile solution containing 0.1 mol/L acetic acid as a mobile phase solution B under the conditions of a flow rate of 1 mL/min, a sample injection volume of 10 μL, and a UV detector wavelength of 280 nm. The gradient conditions are as described below.

Concentration Gradient Condition (vol %)

| Time | Solution A concentration | Solution B concentration |
| --- | --- | --- |
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 60 min | 97% | 3% |

2. Analysis of Quinic Acid

A sample and 5% perchloric acid were mixed. After that, the mixture was diluted in a measuring flask with ion-exchanged water, and appropriately diluted, filtered, and analyzed with a high-performance liquid chromatograph.

Analytical Instrument
  Model: LC-20AD (manufactured by Shimadzu Corporation)
  Detector: UV-visible absorptiometer SPD-20AV (manufactured by Shimadzu Corporation)
  Column: Gelpack GL-C610H-S×2 φ7.8 mm×300 mm (manufactured by Hitachi Chemical Co., Ltd.)
  Column temperature: 40° C.
  Mobile phase: 3 mmol/L perchloric acid
  Reaction liquid: 15 mmol/L disodium hydrogenphosphate solution containing 0.2 mmol/L bromthymol blue
  Flow rate: 0.5 mL/min for mobile phase, 0.6 mL/min for reaction liquid
  Measurement wavelength: 445 nm 3. Analysis of Polysaccharide (1) Quantification Method A sample was diluted with pure water, and then the dilution was sequentially passed through 0.5 g of a silica-based packing material (BONDELUTE C18, manufactured by Varian Inc.), 0.5 g of a strongly basic anion-exchange resin (SAX, manufactured by Varian Inc.), and 0.5 g of a strongly acidic cation-exchange resin (SCX, manufactured by Varian Inc.). Thus, a sample was prepared.

Analysis was performed using a high-performance liquid chromatograph (D-2000, manufactured by Hitachi, Ltd.) under the following conditions.

A strong anion-exchanged column (TSKgel Suger Axi, manufactured by Tosoh Corporation) was mounted onto the high-performance liquid chromatograph, and measurement was performed at a column temperature of 70° C. by a post-column reaction method. A distilled water solution containing 0.5 mol/L boric acid was used as a mobile phase solution, and a flow rate and a sample injection volume were set to 0.4 mL/min and 10 μL, respectively. In addition, a distilled water solution containing 1% of arginine and 3% of boric acid was used as a post-column reaction reagent, and a reaction was performed at 150° C. A detector used was a fluorescence detector, and detection was performed under the following conditions: an excitation wavelength of 320 nm and a fluorescence detection wavelength of 430 nm.

(2) Dextrose Equivalent 2.5 g of a sample is precisely weighed and dissolved in water to obtain 200 mL of a solution. 10 mL of the solution is precisely measured, and 10 mL of a 0.04 mol/L iodine solution and 15 mL of a 0.04 mol/L sodium hydroxide solution are added to the measured solution. The mixture is allowed to stand in the dark for 20 minutes. Next, 5 mL of 2 mol/L hydrochloric acid is added to be mixed with the mixture, and then the resultant is titrated with a 0.04 mol/L sodium thiosulfate solution. When the liquid becomes slightly yellow in the vicinity of an end point of the titration, two drops of a starch indicator are added to continue the titration, and the time point at which the color of the liquid disappears is defined as the end point of the titration. A blank test is separately performed. The dextrose equivalent (DE) is calculated by the following expression.

$$DE=(p-q) \times f \times 3.602/(1{,}000)/(200/10)/\{r \times (100-s) \times 100\} \times 100$$

In the expression, "p" represents a titration value (mL), "q" represents a blank value (mL), "f" represents a factor value of a sodium thiosulfate solution, "r" represents a weighed amount (mg) of the sample, and "s" represents a moisture value (%) of the sample.

4. Evaluation of Change in Hue

A powder sample was placed in a circular cell of 30φ, and an a* value in an L*a*b* color system was obtained by reflection measurement through use of a spectrophotometer (model: Color Meter ZE-2000, manufactured by Nippon Denshoku Industries Co., Ltd.). An absolute value Δa* of a difference between an a* value of a powdered green tea extract composition after storage under an atmosphere of 37° C./50% RH for 6 weeks and an a* value of the powdered green tea extract composition immediately after production was determined.

Production Example 1

Production of Green Tea Extract (I)

30 g of dried green tea leaves were extracted with 300 mL of hot water at 90° C. for 30 minutes and then filtered. The obtained green tea extract was dried by spray drying to obtain a powdered green tea extract (I). The green tea extract (I) had a content of non-polymer catechins (A) of 38.3 mass % and a mass ratio between the non-polymer catechins (A) and quinic acid (B), [(B)/(A)], of 0.2.

Production Example 2

Production of Green Tea Extract (II)

200 g of the powdered green tea extract (I) was added to 500 g of a 53.6 mass % ethanol aqueous solution, and then 69 g of acid clay (Mizuka Ace #600, manufactured by Mizusawa Industrial Chemicals, Ltd.) and 22 g of a filter aid (Solka-Floc, manufactured by Kurita Water Industries Ltd.) were added to the mixture. After that, the resultant was stirred at 40° C. for 1 hour. Next, 300 g of a 92.2 mass % ethanol aqueous solution was added to the resultant, and the mixture was stirred at 40° C. for 30 minutes. Then, the mixture was filtered with a No. 2 paper filter having a precoat agent deposited thereon. Then, the filtrate was caused to pass through a column filled with 28 g of activated carbon (SG-K, manufactured by Futamura Chemical Co., Ltd.), and the recovered liquid was subjected to topping to distill off ethanol, to thereby obtain a green tea extract (II). The green tea extract (II) had a content of non-polymer catechins (A) of 21.9 mass % (42.7 mass % in solids), and had amass ratio between the non-polymer catechins (A) and the quinic acid (B), [(B)/(A)], of 0.16.

Production Example 3

Production of Green Tea Extract (III)

200 g of the powdered green tea extract (I) was added to 800 g of a 92.2 mass % ethanol aqueous solution, and then 100 g of acid clay (Mizuka Ace #600, manufactured by Mizusawa Industrial Chemicals, Ltd.) and 12.6 g of a filter aid (Solka-Floc, manufactured by Kurita Water Industries Ltd.) were added to the mixture. After that, the resultant was stirred at 25° C. for 6 hours. Then, the mixture was filtered with a No. 2 paper filter having a precoat agent deposited thereon. Then, water was added to the filtrate so that the concentration of ethanol reached 60 mass %, followed by centrifugation, to thereby recover a supernatant. Then, the filtrate was caused to pass through a column filled with 24 g of activated carbon (SG-K, manufactured by Futamura Chemical Co., Ltd.), and the recovered liquid was subjected to topping to distill off ethanol, to thereby obtain a green tea extract (III). The green tea extract (III) had a content of non-polymer catechins (A) of 14.3 mass % (62.5 mass % in solids), and had a mass ratio between the non-polymer catechins (A) and the quinic acid (B), [(B)/(A)], of 0.02.

Examples 1 to 7

200 g of the green tea extract (III) and 60 g of a polysaccharide were added so that the mass ratio between the non-polymer catechins (A) and the polysaccharide (C), [(C)/(A)], became 2.1, and then, the mixture was stirred at 25° C. for 30 minutes. After that, the mixed solution was dried by spray drying and dried so that the volatile content reached a ratio shown in Table 1 to obtain a powdered green tea extract composition. A change in hue was evaluated through use of 2 g of the obtained powdered green tea extract composition. The results are shown in Table 1.

Reference Example 1

A change in hue was evaluated through use of 2 g of the powdered green tea extract (I). As a result, Δa* was 0.3, and a volatile content was 2.0 mass %.

Comparative Example 1

The green tea extract (II) was dried by spray drying and dried so that the volatile content reached a ratio shown in Table 1 to obtain a powdered green tea extract composition. A change in hue was evaluated through use of 2 g of the obtained powdered green tea extract composition. The results are shown in Table 1.

Comparative Example 2

The green tea extract (III) was dried by spray drying and dried so that the volatile content reached a ratio shown in Table 1 to obtain a powdered green tea extract composition. A change in hue was evaluated through use of 2 g of the obtained powdered green tea extract composition. The results are shown in Table 1. The value of Δa* in this Comparative Example serves as a reference for the suppression rate of Δa* in the subsequent Examples and Comparative Examples each having the same mass ratio [(B)/(A)].

TABLE 1

|  |  |  | Comparative Example | | Example | | | | | | |
|---|---|---|---|---|---|---|---|---|---|---|---|
|  |  |  | 1 | 2 | 1 | 2 | 3 | 4 | 5 | 6 | 7 |
|  | Tea extract (II)[1] | [g] | 200 |  |  |  |  |  |  |  |  |
|  | Tea extract (III)[2] | [g] |  | 200 | 200 | 200 | 200 | 200 | 200 | 200 | 200 |
|  | Polysaccharide[3] | [g] | 0 | 0 | 60 | 60 | 60 | 60 | 60 | 60 | 60 |
| Production conditions | Presence or absence of mixing in presence of aqueous solvent | [—] | Absent | Absent | Present | Present | Present | Present | Present | Present | Present |
|  | Non-polymer catechins in mixed solution | [mass %] | — | — | 11.0 | 11.0 | 11.0 | 11.0 | 11.0 | 11.0 | 11.0 |

TABLE 1-continued

|  |  |  | Comparative Example | | Example | | | | | | |
|---|---|---|---|---|---|---|---|---|---|---|---|
|  |  |  | 1 | 2 | 1 | 2 | 3 | 4 | 5 | 6 | 7 |
|  | Mixing time | [min] | — | — | 30 | 30 | 30 | 30 | 30 | 30 | 30 |
| Analysis value or calculated value | (A) Non-polymer catechins | [mass %] | 42.7 | 62.5 | 28.2 | 27.8 | 27.5 | 27.4 | 27.2 | 27.1 | 26.9 |
|  | (B) Quinic acid | [mass %] | 6.8 | 1.3 | 0.6 | 0.6 | 0.6 | 0.6 | 0.6 | 0.6 | 0.6 |
|  | (C) Polysaccharide | [mass %] | 0.0 | 0.0 | 56.9 | 56.1 | 55.4 | 55.2 | 54.9 | 54.6 | 54.2 |
|  | Volatile content (105° C., 15 min) | [mass %] | 2.0 | 2.0 | 2.0 | 3.0 | 4.0 | 4.1 | 4.6 | 4.9 | 5.6 |
|  | Mass ratio [(B)/(A)] | [—] | 0.16 | 0.02 | 0.02 | 0.02 | 0.02 | 0.02 | 0.02 | 0.02 | 0.02 |
|  | Mass ratio [(C)/(A)] | [—] | 0 | 0 | 2.1 | 2.1 | 2.1 | 2.1 | 2.1 | 2.1 | 2.1 |
| Evaluation | Δa* value | [—] | 3.2 | 5.4 | 2.1 | 1.9 | 2.1 | 2.1 | 1.9 | 1.9 | 4.0 |
|  | Suppression rate | [%] | — | — | 61.1 | 64.8 | 61.1 | 61.1 | 64.8 | 64.8 | 25.9 |

[1] Tea extract obtained in Production Example 2
[2] Tea extract obtained in Production Example 3
[3] Sandec #100, manufactured by Sanwa Starch Co., Ltd., DE = 10 to 13 (SOMOGYI method)

Examples 8 to 16 and Comparative Example 3

The green tea extract (III) and a polysaccharide were added to distilled water so that the mass ratio between the non-polymer catechins (A) and the polysaccharide (C), [(C)/(A)], reached a ratio shown in Table 2. After that, water was added to the mixture so that the content of the non-polymer catechins (A) in the mixed solution reached a ratio shown in Table 2, followed by stirring at 25° C. for 30 minutes. After that, the mixed solution was dried by spray drying and dried so that the volatile content reached a ratio shown in Table 2 to obtain a powdered green tea extract composition. A change in hue was evaluated through use of 2 g of the obtained powdered green tea extract composition. The results are shown in Table 2.

TABLE 2

|  |  |  | Comparative Example | Example | | | | | | | | |
|---|---|---|---|---|---|---|---|---|---|---|---|---|
|  |  |  | 3 | 8 | 9 | 10 | 11 | 12 | 13 | 14 | 15 | 16 |
| Formulation | Tea extract (III)[2] | [g] | 300 | 300 | 300 | 300 | 250 | 200 | 200 | 100 | 50 | 50 |
|  | Polysaccharide[3] | [g] | 45 | 53 | 64 | 75 | 69 | 60 | 72 | 72 | 105 | 117 |
|  | Distilled water | [g] | 84 | 99 | 118 | 136 | 128 | 107 | 134 | 134 | 344 | 383 |
| Production conditions | Presence or absence of mixing in presence of aqueous solvent | [—] | Present | Present | Present | Present | Present | Present | Present | Present | Present | Present |
|  | Non-polymer catechins in mixed solution | [mass %] | 10.0 | 9.5 | 8.9 | 8.4 | 8.0 | 7.8 | 7.0 | 4.7 | 1.4 | 1.3 |
|  | Mixing time | [min] | 30 | 30 | 30 | 30 | 30 | 30 | 30 | 30 | 30 | 30 |
| Analysis value or calculated value | (A) Non-polymer catechins | [mass %] | 37.4 | 35.0 | 32.0 | 29.6 | 28.0 | 26.7 | 24.0 | 14.8 | 6.0 | 5.4 |
|  | (B) Quinic acid | [mass %] | 0.8 | 0.7 | 0.7 | 0.6 | 0.6 | 0.6 | 0.5 | 0.3 | 0.1 | 0.1 |
|  | (C) Polysaccharide | [mass %] | 39.2 | 43.2 | 47.8 | 51.7 | 54.1 | 56.1 | 60.4 | 74.7 | 88.4 | 88.9 |
|  | Volatile content (105° C., 15 min) | [mass %] | 2.3 | 2.0 | 2.0 | 2.0 | 2.0 | 2.0 | 2.0 | 2.1 | 2.2 | 2.6 |
|  | Mass ratio [(B)/(A)] | [—] | 0.02 | 0.02 | 0.02 | 0.02 | 0.02 | 0.02 | 0.02 | 0.02 | 0.02 | 0.02 |
|  | Mass ratio [(C)/(A)] | [—] | 1.0 | 1.2 | 1.5 | 1.7 | 1.9 | 2.1 | 2.5 | 5.0 | 14.7 | 16.5 |
| Evaluation | Δa* value | [—] | 5.3 | 4.9 | 4.0 | 3.0 | 2.9 | 2.3 | 1.1 | 0.2 | 0.1 | 0.1 |
|  | Suppression rate | [%] | 1.9 | 9.3 | 25.9 | 44.4 | 46.3 | 57.4 | 80.1 | 96.8 | 98.2 | 98.1 |

[2] Tea extract obtained in Production Example 3
[3] Sandec #100, manufactured by Sanwa Starch Co., Ltd., DE = 10 to 13 (SOMOGYI method)

Examples 17 to 20

The green tea extract (III) and a polysaccharide were added to distilled water at such a ratio that the mass ratio between the non-polymer catechins (A) and the polysaccharide (C), [(C)/(A)], reached 2.1. After that, water was added to the mixture so that the content of the non-polymer catechins (A) in the mixed solution reached 8.9 mass %, followed by stirring at 25° C. for a time shown in Table 3. After that, the mixed solution was dried by spray drying and dried so that the volatile content reached a ratio shown in Table 3 to obtain a powdered green tea extract composition. A change in hue was evaluated through use of 2 g of the obtained powdered green tea extract composition. The results are shown in Table 3.

TABLE 3

| | | | Example | | | |
|---|---|---|---|---|---|---|
| | | | 17 | 18 | 19 | 20 |
| Formulation | Tea extract (III)[2] | [g] | 200 | 200 | 200 | 200 |
| | Polysaccharide[3] | [g] | 60 | 60 | 60 | 60 |
| | Distilled water | [g] | 107 | 107 | 107 | 107 |
| Production conditions | Presence or absence of mixing in presence of aqueous solvent | [—] | Present | Present | Present | Present |
| | Non-polymer catechins in mixed solution | [mass %] | 7.8 | 7.8 | 7.8 | 7.8 |
| | Mixing time | [min] | 6 | 15 | 30 | 60 |
| Analysis value or calculated value | (A) Non-polymer catechins | [mass %] | 26.7 | 26.7 | 26.7 | 26.7 |
| | (B) Quinic acid | [mass %] | 0.6 | 0.6 | 0.6 | 0.6 |
| | (C) Polysaccharide | [mass %] | 56.1 | 56.1 | 56.1 | 56.1 |
| | Volatile content (105° C., 15 min) | [mass %] | 2.0 | 2.0 | 2.0 | 2.0 |
| | Mass ratio [(B)/(A)] | [—] | 0.02 | 0.02 | 0.02 | 0.02 |
| | Mass ratio [(C)/(A)] | [—] | 2.1 | 2.1 | 2.1 | 2.1 |
| Evaluation | Δa* value | [—] | 2.4 | 2.2 | 2.0 | 2.0 |
| | Suppression rate | [%] | 55.6 | 59.3 | 62.9 | 63.0 |

[2] Tea extract obtained in Production Example 3
[3] Sandec #100, manufactured by Sanwa Starch Co., Ltd., DE = 10 to 13 (SOMOGYI method)

Examples 21 to 24

The green tea extract (III) and a polysaccharide were added to distilled water at such a ratio that the mass ratio between the non-polymer catechins (A) and the polysaccharide (C), [(C)/(A)], reached 2.1. After that, water was added to the mixture so that the content of the non-polymer catechins (A) in the mixed solution reached a ratio shown in Table 4, followed by stirring at 25° C. for 30 minutes. After that, the mixed solution was dried by spray drying and dried so that the volatile content reached a ratio shown in Table 4 to obtain a powdered green tea extract composition. A change in hue was evaluated through use of 2 g of the obtained powdered green tea extract composition. The results are shown in Table 4.

TABLE 4

| | | | Example | | | |
|---|---|---|---|---|---|---|
| | | | 21 | 22 | 23 | 24 |
| Formulation | Tea extract (III)[2] | [g] | 200 | 200 | 200 | 200 |
| | Polysaccharide[3] | [g] | 60 | 60 | 60 | 60 |
| | Distilled water | [g] | 3,000 | 440 | 120 | 0 |
| Production conditions | Presence or absence of mixing in presence of aqueous solvent | [—] | Present | Present | Present | Present |

TABLE 4-continued

|  |  |  | Example | | | |
| --- | --- | --- | --- | --- | --- | --- |
|  |  |  | 21 | 22 | 23 | 24 |
|  | Non-polymer catechins in mixed solution | [mass %] | 0.9 | 4.0 | 7.4 | 10.8 |
|  | Mixing time | [min] | 30 | 30 | 30 | 30 |
| Analysis value or calculated value | (A) Non-polymer catechins | [mass %] | 26.7 | 26.7 | 26.7 | 26.7 |
|  | (B) Quinic acid | [mass %] | 0.6 | 0.6 | 0.6 | 0.6 |
|  | (C) Polysaccharide | [mass %] | 56.1 | 56.1 | 56.1 | 56.1 |
|  | Volatile content (105° C., 15 min) | [mass %] | 2.0 | 2.0 | 2.0 | 2.0 |
|  | Mass ratio [(B)/(A)] | [—] | 0.02 | 0.02 | 0.02 | 0.02 |
|  | Mass ratio [(C)/(A)] | [—] | 2.1 | 2.1 | 2.1 | 2.1 |
| Evaluation | Δa* value | [—] | 3.3 | 2.9 | 2.3 | 2.0 |
|  | Suppression rate | [%] | 38.9 | 46.9 | 57.0 | 63.0 |

[2]Tea extract obtained in Production Example 3
[3]Sandec #100, manufactured by Sanwa Starch Co., Ltd., DE = 10 to 13 (SOMOGYI method)

Comparative Examples 4 to 6

The green tea extract (II) and the green tea extract (III) were mixed at ratios shown in Table 5 to obtain green tea extract mixtures having mass ratios [(B)/(A)] of 0.05, 0.08, and 0.11, respectively. Each of the obtained green tea extract mixtures was powdered by spray drying to obtain a powdered dry green tea extract. The obtained dry green tea extract was evaluated for a change in hue. The results are shown in Table 5 together with the results of Comparative Example 2.

Examples 25 to 28

200 g of each of the green tea extract mixtures obtained in Comparative Examples 2 and 4 to 6 and 60 g of a polysaccharide were added to 106.7 g of distilled water, followed by stirring at 25° C. for 30 minutes. After that, the mixed solution was dried by spray drying to obtain a powdered green tea extract composition. The obtained green tea extract composition was evaluated for a change in hue. The results are shown in Table 5.

TABLE 5

|  |  |  | Comparative Example | | | | Example | | | |
| --- | --- | --- | --- | --- | --- | --- | --- | --- | --- | --- |
|  |  |  | 2 | 4 | 5 | 6 | 25 | 26 | 27 | 28 |
| Formulation | Tea extract (II)[1] | [g] | 0 | 50 | 100 | 150 | 0 | 50 | 100 | 150 |
|  | Tea extract (III)[2] | [g] | 200 | 150 | 100 | 50 | 200 | 150 | 100 | 50 |
|  | Polysaccharide[3] | [g] | 0 | 0 | 0 | 0 | 60 | 60 | 60 | 60 |
|  | Distilled water | [g] | 0 | 0 | 0 | 0 | 106.7 | 106.7 | 106.7 | 106.7 |
| Production conditions | Presence or absence of mixing in presence of aqueous solvent | [—] | Absent | Absent | Absent | Absent | Present | Present | Present | Present |
|  | Non-polymer catechins in mixed solution | [mass %] | — | — | — | — | 7.8 | 8.8 | 9.9 | 10.9 |
|  | Mixing time | [min] | — | — | — | — | 30 | 30 | 30 | 30 |
| Analysis value or calculated value | (A) Non-polymer catechins | [mass %] | 62.5 | 57.6 | 52.6 | 47.7 | 26.7 | 29.0 | 30.7 | 32.2 |
|  | (B) Quinic acid | [mass %] | 1.3 | 2.7 | 4.1 | 5.4 | 0.6 | 1.3 | 2.0 | 2.8 |
|  | (C) Polysaccharide | [mass %] | 0.0 | 0.0 | 0.0 | 0.0 | 56.1 | 53.6 | 50.9 | 48.4 |
|  | Volatile content (105° C., 15 min) | [mass %] | 2.0 | 2.0 | 2.0 | 2.0 | 2.0 | 2.0 | 2.0 | 2.0 |
|  | Mass ratio [(B)/(A)] | [—] | 0.02 | 0.05 | 0.08 | 0.11 | 0.02 | 0.05 | 0.08 | 0.11 |
|  | Mass ratio [(C)/(A)] | [—] | 0 | 0 | 0 | 0 | 2.1 | 1.8 | 1.7 | 1.5 |
| Evaluation | Δa* value | [—] | 5.4 | 5.5 | 5.1 | 4.2 | 2.1 | 1.0 | 0.7 | 0.4 |
|  | Suppression rate | [%] | — | — | — | — | 61.1 | 81.8 | 86.3 | 90.5 |

[1]Tea extract obtained in Production Example 2
[2]Tea extract obtained in Production Example 3
[3]Sandec #100, manufactured by Sanwa Starch Co., Ltd., DE = 10 to 13 (SOMOGYI method)

From Reference Example 1, Comparative Examples 1 and 2 in Table 1, and Examples 25 to 28, it is understood that, when the mass ratio [(B)/(A)] is decreased by purification of the green tea extract composition, there arises a problem of a change in hue after storage for a long period of time. In contrast, from Examples in Tables 1 to 5, it is understood that, when the polysaccharide (C) is incorporated at a specific ratio with respect to the non-polymer catechins (A), a powdered green tea extract composition in which a change in hue after storage for a long period of time is suppressed is obtained.

The invention claimed is:

1. A powdered green tea extract composition, comprising the following components (A), (B), and (C):
    (A) non-polymer catechins;
    (B) quinic acid; and
    (C) a polysaccharide,
    wherein:
    the powdered green tea extract composition has a volatile content of 5.6 mass % or less,
    a mass ratio of the component (B) to the component (A), [(B)/(A)], is less than 0.2,
    a mass ratio of the component (C) to the component (A), [(C)/(A)], is 1.2 or more,
    when an absolute value ($\Delta a^*$) of a difference between an $a^*$ value in an L*a*b* color system of the powdered green tea extract composition after storage under an atmosphere of 37° C. and 50% RH for 6 weeks and an $a^*$ value in the L*a*b* color system of the powdered green tea extract composition immediately after production is obtained, the $\Delta a^*$ of the powdered green tea extract composition is a value less than $\Delta a^*$ of a powdered green tea extract composition α which has the same mass ratio [(B)/(A)] as the mass ratio [(B)/(A)] of the powdered green tea extract composition, and which is free of the component (C), and
    a change rate calculated by the following expression (2) is 5% or more:

$$(\Delta a^* - \Delta a_1^*)/\Delta a^* \times 100 \quad (2)$$

where $\Delta a_1^*$ represents the absolute value of the difference between the $a^*$ value in the L*a*b* color system of the powdered green tea extract composition after storage under the atmosphere of 37° C. and 50% RH for 6 weeks and the $a^*$ value in the L*a*b* color system of the powdered green tea extract composition immediately after production, and $\Delta a^*$ represents an absolute value of a difference between an $a^*$ value in the L*a*b* color system of the powdered green tea extract composition α after storage under the atmosphere of 37° C. and 50% RH for 6 weeks and an $a^*$ value in the L*a*b* color system of the powdered green tea extract composition a immediately after production.

2. The powdered green tea extract composition according to claim 1, wherein the component (C) is a polysaccharide derived from starch.

3. The powdered green tea extract composition according to claim 1, wherein the component (C) has a dextrose equivalent of from 1 to 25.

4. The powdered green tea extract composition according to claim 1, wherein the component (C) is maltodextrin.

5. The powdered green tea extract composition according to claim 1, wherein the powdered green tea extract composition has an average particle size of from 1 μm to 1,000 μm.

6. The powdered green tea extract composition according to claim 1, wherein the volatile content ranges from 1.9 mass % to 5.0 mass %.

7. The powdered green tea extract composition according to claim 1, wherein the mass ratio of the component (B) to the component (A), [(B)/(A)], is from $1 \times 10^{-6}$ to 0.1.

8. The powdered green tea extract composition according to claim 1, wherein the mass ratio of the component (C) to the component (A), [(C)/(A)], is from 1.7 to 15.

9. The powdered green tea extract composition according to claim 1, wherein the change rate calculated by the expression (2) is from 40% to 99%.

10. The powdered green tea extract composition according to claim 1, wherein a content of the component (A) is from 2 mass % to 45 mass %.

11. The powdered green tea extract composition according to claim 1, wherein a content of the component (B) is from 0.00001 mass % to 3 mass %.

12. The powdered green tea extract composition according to claim 1, wherein a content of the component (C) is from 41 mass % to 95 mass %.

13. The powdered green tea extract composition according to claim 1, wherein a content of the component (A) is from 2 mass % to 45 mass %, a content of the component (B) is from 0.00001 mass % to 3 mass %, a content of the component (C) is from 47 mass % to 95 mass %, and the volatile content ranges from 1.9 mass % to 5.0 mass %.

* * * * *